United States Patent
Li et al.

(10) Patent No.: US 11,318,446 B2
(45) Date of Patent: May 3, 2022

(54) ACTIVATED CARBON/PD-GA LIQUID ALLOY COMPOSITE CATALYST, PREPARATION METHOD AND USE THEREOF

(71) Applicant: Taizhou University, Zhejiang Province (CN)

(72) Inventors: Rongrong Li, Zhejiang Province (CN); Deman Han, Zhejiang Province (CN)

(73) Assignee: TAIZHOU UNIVERSITY, Zhejiang (CN)

(*) Notice: Subject to any disclaimer, the term of this patent is extended or adjusted under 35 U.S.C. 154(b) by 56 days.

(21) Appl. No.: 16/885,639

(22) Filed: May 28, 2020

(65) Prior Publication Data
US 2021/0370274 A1 Dec. 2, 2021

(51) Int. Cl.
*B01J 23/62* (2006.01)
*B01J 37/16* (2006.01)
(Continued)

(52) U.S. Cl.
CPC .............. *B01J 23/62* (2013.01); *B01J 6/001* (2013.01); *B01J 37/04* (2013.01); *B01J 37/06* (2013.01); *B01J 37/16* (2013.01)

(58) Field of Classification Search
CPC ... B01J 21/18; B01J 23/62; B01J 6/001; B01J 37/04; B01J 37/06; B01J 37/16
(Continued)

(56) References Cited

U.S. PATENT DOCUMENTS 3,137,571 A * 6/1964 Cooper ............... C22C 5/04
420/463
3,378,590 A * 4/1968 Usami ............... C07C 47/32
568/429
(Continued)

FOREIGN PATENT DOCUMENTS

CN 11 1569872 * 8/2020 ............. B01J 23/62
CN 11 1569874 * 8/2020 ............. B01J 23/66

OTHER PUBLICATIONS

Nobuhiro Iwasa et al., "New catalytic functions of Pd—Zn, Pd—Ga, Pd—In, Pt—Zn, Pt—Ga and Pt—In alloys in the conversions of methanol." Catalysis Letters 54, pp. 119-123. (Year: 1998).*

*Primary Examiner* — Patricia L. Hailey
(74) *Attorney, Agent, or Firm* — Tarolli, Sundheim, Covell & Tummino LLP

(57) ABSTRACT

An activated carbon/palladium-gallium (Pd—Ga) liquid alloy composite catalyst, including a support and an active component supported on the support. The support is acid washed activated carbon. The active component is Pd—Ga liquid alloy. In the present invention, the active component Pd—Ga, present in the form of liquid alloy, forms a self-protective oxide layer. This protects acetylene from secondary reactions on the surface of the catalyst, inhibits or reduces acetylene to deeply hydrogenate to form ethane, thereby increasing ethylene selectivity. The present invention further provides a preparation method of the catalyst, where the catalyst of the present invention is prepared by immersion. The preparation method is simple and easy to operate. When the activated carbon/Pd—Ga liquid alloy composite catalyst provided by the present invention is used for acetylene hydrogenation to prepare ethylene, conversion rate of acetylene is as high as 99.8%, while the ethylene selectivity is as high as 98.9%.

20 Claims, 2 Drawing Sheets

(51) Int. Cl.
*B01J 37/06* (2006.01)
*B01J 37/04* (2006.01)
*B01J 6/00* (2006.01)

(58) Field of Classification Search
USPC ......... 502/182, 185, 333, 355; 420/463, 555
See application file for complete search history.

(56) References Cited

U.S. PATENT DOCUMENTS 3,962,139 A * 6/1976 van de Moesdijk ..... B01J 23/62
    502/215
4,659,384 A * 4/1987 Daigo .................... A61K 6/844
    106/35

\* cited by examiner

ACTIVATED CARBON/PD-GA LIQUID ALLOY COMPOSITE CATALYST, PREPARATION METHOD AND USE THEREOF

TECHNICAL FIELD

The present invention relates to the technical field of catalyst, and in particular to an activated carbon/palladium-gallium (Pd—Ga) liquid alloy composite catalyst, a preparation method and use thereof.

BACKGROUND

Ethylene, an important petrochemical product, is primarily used to produce polyethylene (PE). In the petrochemical field, however, a minute amount of acetylene (1%) is present in the resulting feed gas of ethylene. Further, the minute amount of acetylene mixed may poison catalysts for ethylene polymerization, reducing PE product quality. Therefore, acetylene removal is required before industrial preparation of PE products.

During acetylene removal, conventional methods include selective hydrogenation and partial oxidative steam reforming processes. Compared with partial oxidative steam reforming process, selective catalytic hydrogenation features less pollution and lower energy consumption and has a good effect on acetylene removal. To remove a minute amount of acetylene by selective catalytic hydrogenation, the core primarily lies in the selection of a hydrogenation catalyst. So far, however, a catalyst commonly used in the industry is a nano-Ga—Pd supported $SiO_2$ catalyst. Featuring small particle size of metal particles and large surface area of $SiO_2$ support, the catalyst increases the conversion rate of acetylene, but has poor ethylene selectivity, going against subsequent ethylene polymerization.

SUMMARY

In view of this, an objective of the present invention is to provide an activated carbon/palladium-gallium (Pd—Ga) liquid alloy composite catalyst. The catalyst provided by the present invention features good catalytic activity and high selectivity.

To achieve the above purpose, the present invention provides the following technical solutions.

The present invention provides an activated carbon/palladium-gallium (Pd—Ga) liquid alloy composite catalyst, including a support and an active component supported on the support, where the support is acid washed activated carbon, and the active component is Pd—Ga liquid alloy.

Preferably, a loading amount of Pd in the Pd—Ga liquid alloy is 0.1 to 1 wt %, and a loading amount of Ga in the Pd—Ga liquid alloy is 0.3 to 3 wt %.

The present invention further provides a preparation method of the above activated carbon/Pd—Ga liquid alloy composite catalyst, including the following steps:

(1) mixing palladium and gallium precursors with water to obtain a mixed solution;

(2) immersing acid washed activated carbon in the mixed solution obtained in step (1), and then drying to obtain the acid washed activated carbon supported with palladium salt and gallium salt; and (3) calcining and reducing the acid washed activated carbon supported with palladium salt and gallium salt obtained in step (2) to obtain the activated carbon/Pd—Ga liquid alloy composite catalyst.

Preferably, the acid washed activated carbon in step (2) can be prepared by immersing the activated carbon in an acid solution, and then drying to obtain the acid washed activated carbon.

Preferably, acid(s) in the acid solution may be at least one of sulfuric, nitric, phosphoric, hydrochloric, and hydrofluoric acids.

Preferably, a concentration of the acid solution is 0.3 to 4 mol/L.

Preferably, the palladium precursor(s) in step (1) may be at least one of palladium chloride, palladium acetate, disodium tetrachloropalladate, palladium nitrate, palladium(II) acetylacetonate, and ammonium tetrachloropalladate.

Preferably, the gallium precursor(s) in step (1) may be at least one of gallium nitrate, gallium chloride, gallium(III) ethoxide, gallium(III) isopropoxide, gallium(III) 2,4-pentanedionate, and triethylgallium.

Preferably, the calcination in step (3) is conducted for 1 to 7 h at 400 to 1,200° C.

Preferably, the reduction in step (3) is conducted for 1 to 5 h at 100 to 600° C.

The present invention provides an activated carbon/palladium-gallium (Pd—Ga) liquid alloy composite catalyst, including a support and an active component supported on the support. The support is acid washed activated carbon. The active component is Pd—Ga liquid alloy. Because of more surface functional groups, the present invention selects the acid washed activated carbon to increase the binding ability of the support to the active component and improve catalytic performance of the catalyst. The active component Pd—Ga, present in the form of liquid alloy, forms a self-protective oxide layer. This protects acetylene from secondary reactions on the surface of the catalyst, inhibits or reduces acetylene to deeply hydrogenate to form ethane, thereby increasing ethylene selectivity. As indicated by results of examples, when the activated carbon/Pd—Ga liquid alloy composite catalyst provided by the present invention is used for acetylene hydrogenation to prepare ethylene, conversion rate of acetylene is as high as 99.8%, while the ethylene selectivity is as high as 98.9%.

DETAILED DESCRIPTION

Figure 1:
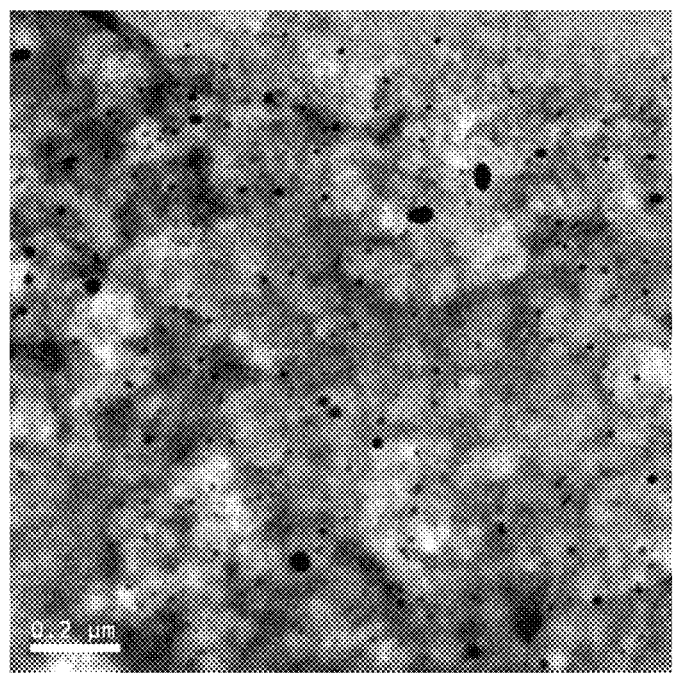
FIG. 1 shows a TEM image of a catalyst prepared according to Example 1 of the present invention.
Figure 2:
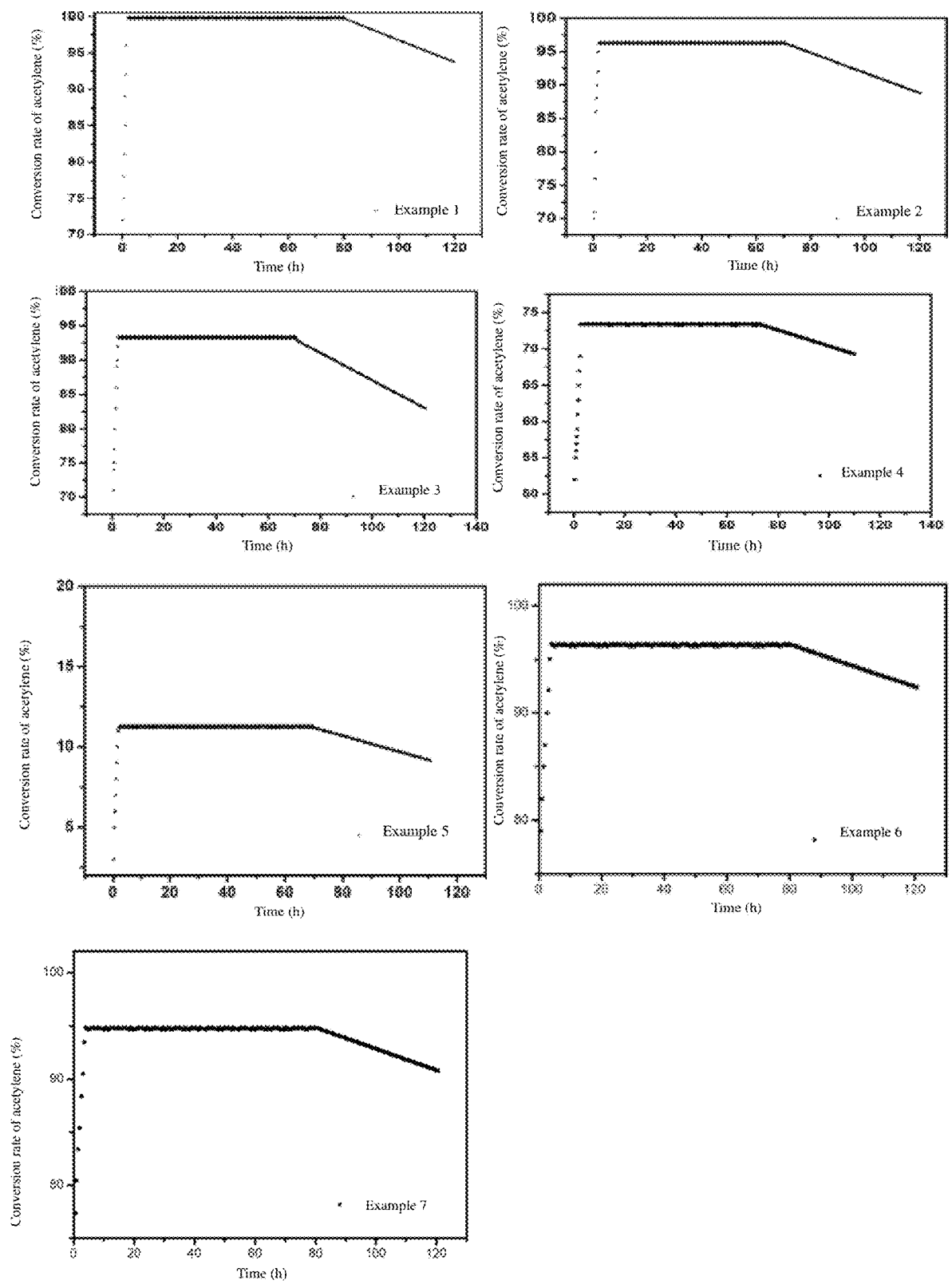
FIG. 2 illustrates how catalysts prepared according to Examples 1 to 7 of the present invention change the conversion rate of acetylene over time.

The present invention provides an activated carbon/palladium-gallium (Pd—Ga) liquid alloy composite catalyst, including a support and an active component supported on the support. The support is acid washed activated carbon. The active component is Pd—Ga liquid alloy.

The activated carbon/Pd—Ga liquid alloy composite catalyst provided by the present invention includes a support, where the support is acid washed activated carbon. In the present invention, because of more surface functional groups, the acid washed activated carbon increases the binding ability of the support to the active component and improves catalytic performance of the catalyst.

The activated carbon/Pd—Ga liquid alloy composite catalyst provided by the present invention includes an active component supported on the support, where the active component is Pd—Ga liquid alloy. The active component Pd—Ga of the catalyst provided by the present invention, present in the form of liquid alloy, forms a self-protective oxide layer. This protects acetylene from secondary reactions on the surface of the catalyst, inhibits or reduces acetylene to deeply hydrogenate to form ethane, thereby increasing ethylene selectivity.

In the present invention, a loading amount of Pd in the Pd—Ga liquid alloy is preferably 0.1 to 1 wt %, more preferably 0.5 to 0.9 wt %, and most preferably 0.6 to 0.8 wt %. A loading amount of Ga in the Pd—Ga liquid alloy is 0.3 to 3 wt %, more preferably 0.5 to 2 wt %, and most preferably 0.6 to 1 wt. In the present invention, the loading amounts of Pd and Ga are limited in the above ranges. Pd and Ga are mutually matched and act as an active component, saving the consumption of precious metals.

In the present invention, the Pd—Ga liquid alloy is preferably distributed in channels of the acid washed activated carbon.

For the activated carbon/Pd—Ga liquid alloy composite catalyst provided by the present invention, the acid washed activated carbon is used as a support. Because of more surface functional groups, the acid washed activated carbon increases the binding ability of the support to the active component and improves catalytic performance of the catalyst. The active component Pd—Ga, present in the form of liquid alloy, forms a self-protective oxide layer. This protects acetylene from secondary reactions on the surface of the catalyst, inhibits or reduces acetylene to deeply hydrogenate to form ethane, thereby increasing ethylene selectivity.

The present invention further provides a preparation method of the activated carbon/Pd—Ga liquid alloy composite catalyst according to the above solution, including the following steps:

(1) mixing palladium and gallium precursors with water to obtain a mixed solution;

(2) immersing acid washed activated carbon in the mixed solution obtained in step (1), and then drying to obtain the acid washed activated carbon supported with palladium salt and gallium salt; and (3) calcining and reducing the acid washed activated carbon supported with palladium salt and gallium salt obtained in step (2) to obtain the activated carbon/Pd—Ga liquid alloy composite catalyst.

In the present invention, all raw materials used are commercially available products well known in the art, unless otherwise specified.

In the present invention, all operations are conducted at room temperature, unless otherwise specified.

In the present invention, palladium and gallium precursors are mixed with water to obtain a mixed solution.

In the present invention, the mixing of palladium and gallium precursors with water preferably refers to: mixing palladium and gallium precursors with water, respectively, to obtain a palladium precursor solution and a gallium precursor solution; mixing the palladium precursor solution and the gallium precursor solution with the rest of water to obtain the mixed solution.

In the present invention, the palladium precursor(s) may preferably be at least one of palladium chloride, palladium acetate, disodium tetrachloropalladate, palladium nitrate, palladium(II) acetylacetonate, and ammonium tetrachloropalladate, and more preferably palladium chloride.

In the present invention, the gallium precursor(s) may be at least one of gallium nitrate, gallium chloride, gallium(III) ethoxide, gallium(III) isopropoxide, gallium(III) 2,4-pentanedionate, and triethylgallium, and more preferably gallium chloride.

In the present invention, the water is preferably deionized water.

In the present invention, a concentration of palladium precursor solution is preferably 5 to 15 mg/mL, more preferably 6 to 12 mg/mL, and most preferably 10 mg/mL.

In the present invention, a concentration of gallium precursor solution is preferably 5 to 15 mg/mL, more preferably 6 to 12 mg/mL, and most preferably 10 mg/mL.

In the present invention, a tool for transferring the precursor solution(s) is preferably a pipette. In the present invention, a specification of the pipette is preferably 1 mL.

Methods for mixing the palladium and gallium precursors with water are not specifically limited in the present invention, as long as the above three substances are mixed well.

After the mixed solution is obtained, in the present invention, the acid washed activated carbon is immersed in the mixed solution, and then dried to obtain an activated carbon supported with palladium salt and gallium salt.

In the present invention, preparation of the acid washed activated carbon includes: immersing the activated carbon in an acid solution, and then drying to obtain the acid washed activated carbon. In the present invention, acid(s) in the acid solution may preferably be at least one of sulfuric, nitric, phosphoric, hydrochloric, and hydrofluoric acids, more preferably an acid mixture composed of at least two of sulfuric, nitric, phosphoric, hydrochloric, and hydrofluoric acids, and most preferably an acid mixture composed of nitric and hydrochloric acids.

In the present invention, a concentration of the acid solution is preferably 0.3 to 4 mol/L, more preferably 0.8 to 3 mol/L, and most preferably 0.9 to 2 mol/L. When there are at least two acids in the acid solution, a proportion of the acids is not specifically limited in the present invention, as long as total concentration of the acid solution meets requirements.

Consumption of the acid solution is not specifically limited in the present invention, as long as the activated carbon can be immersed fully. In the present invention, time to immerse the activated carbon in the acid solution is preferably 6 to 12 h, more preferably 7 to 11 h, and most preferably 8 to 10 h. Methods for drying after immersing the activated carbon in the acid solution are not specifically limited in the present invention, as long as the water is removed from the acid washed activated carbon. In the present invention, a temperature of the drying after immersing the activated carbon in the acid solution is preferably 80 to 120° C., more preferably 90 to 110° C., and most preferably 100° C.; drying time is preferably 6 to 12 h, more preferably 7 to 11 h, and most preferably 8 to 10 h; drying atmosphere is preferably air.

In the present invention, a method for immersing the acid washed activated carbon in the acid solution is preferably incipient impregnation or excess volume impregnation, and more preferably incipient impregnation. In the present invention, a mass ratio of palladium in the mixed solution to the acid washed activated carbon is preferably 0.1 to 1%, more preferably 0.5 to 1%, and most preferably 0.6 to 0.9%. A mass ratio of gallium to the acid washed activated carbon is preferably 0.3 to 3%, more preferably 0.5 to 2%, and most preferably 0.6 to 1%.

In the present invention, the immersion of the acid washed activated carbon in the mixed solution preferably includes stirring and standing sequentially. Stirring methods are not specifically limited in the present invention, as long as stirring methods used are well known to those skilled in the art. In the present invention, the stirring time is preferably 0.2 to 2 h, more preferably 0.4 to 1.5 h, and most preferably 0.5 to 1 h. Standing methods are not specifically limited in the present invention, as long as standing methods used are well known to those skilled in the art. In the present invention, the standing time is preferably 4 to 24 h, more preferably 6 to 12 h, and most preferably 8 to 10 h.

In the present invention, a temperature of the drying after immersing the acid washed activated carbon in the mixed solution is preferably 80 to 120° C., more preferably 90 to 110° C., and most preferably 100° C.; drying time is preferably 6 to 12 h, more preferably 7 to 11 h, and most preferably 8 to 10 h; drying atmosphere is preferably vacuum drying.

After the acid washed activated carbon supported with palladium salt and gallium salt is obtained, in the present invention, the acid washed activated carbon supported with palladium salt and gallium salt is calcined and reduced to obtain the activated carbon/Pd—Ga liquid alloy composite catalyst.

In the present invention, the calcination temperature is preferably 400 to 1,200° C., more preferably 600 to 1,100° C., and most preferably 900 to 1,000° C.; the calcination time is preferably 1 to 7 h, more preferably 2 to 6 h, and most preferably 4 to 5 h.

In the present invention, the calcination condition is preferably inert gas condition. In the present invention, the inert gas(es) may preferably be at least one of argon, nitrogen, and helium. In the present invention, during the calcination process, palladium and gallium, bonded by metallic bonds, increase the catalytic performance and stability of the catalyst.

In the present invention, the reduction temperature is preferably 100 to 600° C., more preferably 200 to 400° C., and most preferably 250 to 350° C.; the reduction time is preferably 1 to 5 h, more preferably 2 to 4 h, and most preferably 3 h. In the present invention, the reduction gas(es) may preferably be any one of hydrogen, methane, hydrogen sulfide, and ammonia. In the present invention, the palladium salt and the gallium salt in the process of the reduction ultimately form a Pd—Ga liquid alloy. Present in the form of liquid alloy, the Pd—Ga liquid alloy forms a self-protective oxide layer. This protects acetylene from secondary reactions on the surface of the catalyst, inhibits or reduces acetylene to deeply hydrogenate to form ethane, thereby increasing ethylene selectivity.

The present invention provides use of the activated carbon/Pd—Ga liquid alloy composite catalyst according to the above solutions or the activated carbon/Pd—Ga liquid alloy composite catalyst prepared by the preparation method according to the above solutions in the preparation of ethylene by acetylene hydrogenation.

In the present invention, apparatus for the reaction is preferably a reaction device with a fixed bed. In the present invention, a method for using the catalyst is preferably to load on the fixed bed. In the present invention, a method for exposing the catalyst to reaction gas(es) is preferably to flow the reaction gas(es) over the catalyst.

In the present invention, molar volume ratios of $H_2$ to $C_2H_2$ (both of which are raw materials for the reaction) are not specifically limited, as long as adjustment is made according to a chemical reaction equation. In examples of the present invention, a molar volume ratio of $H_2$ to $C_2H_2$ (both of which are raw materials for the reaction) is preferably 2:1.

In the present invention, a volume space velocity of the reaction gas(es) is preferably (1,200-36,000)/h, more preferably (2,000-3,000)/h, and most preferably (2,400-2,800)/h.

In the present invention, temperature in the reaction is preferably 30 to 210° C., more preferably 80 to 200° C., and most preferably 110 to 150° C.

In the present invention, pressure in the reaction is preferably 0.05 to 0.2 MPa, more preferably 0.06 to 0.1 MPa, and most preferably 0.07 to 0.08 MPa.

When the catalyst provided by the present invention is used for acetylene hydrogenation to prepare ethylene, conversion rate of acetylene is as high as 99.8%, while the ethylene selectivity is as high as 98.9%.

The activated carbon/Pd—Ga liquid alloy composite catalyst, the preparation method and the use thereof provided by the present invention will be described in detail in connection with the following examples, but they should not be construed as limiting the claimed scope of the present invention.

EXAMPLE 1

Preparation of Acid Washed Activated Carbon

Ten grams of activated carbon was immersed in 20 mL of acid mixture of nitric and hydrochloric acids (total acid concentration, 2 mol/L), treated for 6 h, and dried under an air atmosphere for 8 h at 100° C. to obtain an acid washed activated carbon.

Preparation of Precursor Solutions

Palladium precursor solution: One gram of $PdCl_2$ was weighed in a beaker, and dissolved in concentrated hydrochloric acid. The concentrated hydrochloric acid was added until $PdCl_2$ was dissolved. The above solution was transferred into a 100 ml volumetric flask, while deionized water was filled to the corresponding scale to obtain a $PdCl_2$ solution, which had a mass concentration of $PdCl_2$ of 10 mg/mL.

Gallium precursor solution: Preparation of gallium precursor solution was the same as that of palladium precursor solution, but the only difference was that $PdCl_2$ was replaced with $GaCl_3$.

Preparation of Activated Carbon/Palladium-Gallium (Pd—Ga) Liquid Alloy Composite Catalyst 1) Using a 1 mL pipette, 1.670 ml of the above palladium precursor solution and 2.520 mL of the above gallium precursor solution were transferred into a beaker with water, respectively. The volume of the water was dependent on that of the activated carbon support (metal components were supported by incipient impregnation). After stirring for 0.5 h, a mixed solution was obtained.

2) The mixed solution obtained in Step 1 was charged into 1 g of acid washed activated carbon, stirred for 1 h, subsequently stood for 6 h, and dried in a vacuum drying oven for 11 h at 110° C. An activated carbon supported with palladium salt and gallium salt was obtained.

3) The acid washed activated carbon supported with palladium salt and gallium salt obtained in Step 2 was calcined under a nitrogen atmosphere for 4 h at 1,000° C., followed by high temperature reduction under a hydrogen atmosphere for 2 h at a reduction temperature of 200° C. An activated carbon/Pd—Ga liquid alloy composite catalyst was obtained.

FIG. 1 shows a TEM image of the catalyst prepared according to the example. From FIG. 1, black points represent Pd particles. As is evident from the image, Pd particles are uniformly distributed in the catalyst prepared according to the method provided by the present invention.

Two hundred milligrams of the resulting activated carbon/Pd—Ga liquid alloy composite catalyst was loaded on a fixed bed. Reaction gases ($C_2H_2$, $H_2$, and $C_2H_4$) were introduced. The foregoing gases had a molar ratio of 1:2:100. Reaction gases had a volume space velocity of 2400 h$^{-1}$. Reaction gases reacted at 110° C. and at a pressure of 0.05 MPa.

Example 2

Operating procedure was the same as that of Example 1. The only difference was that 5.040 mL of gallium precursor solution was transferred.

Example 3

Operating procedure was the same as that of Example 1. The only difference was that 1.260 mL of gallium precursor solution was transferred.

Example 4

Operating procedure was the same as that of Example 1. The only difference was that addition of the gallium precursor solution was omitted.

Example 5

Operating procedure was the same as that of Example 1. The only difference was that addition of the palladium precursor solution was omitted.

Example 6

Operating procedure was the same as that of Example 1. The only difference was that the calcination temperature was 900° C.

Example 7

Operating procedure was the same as that of Example 1. The only difference was that the calcination temperature was 1,100° C.

TABLE 1

Data for conversion rate of acetylene and ethylene selectivity of catalysts prepared according to Examples 1 to 7

| Example | Conversion rate of acetylene | Ethylene selectivity |
| --- | --- | --- |
| Example 1 | 99.8% | 98.9% |
| Example 2 | 96.2% | 91.2% |
| Example 3 | 93.3% | 87.7% |
| Example 4 | 73.3% | 78.5% |
| Example 5 | 11.2% | 35.3% |
| Example 6 | 96.4% | 94.3% |
| Example 7 | 94.8% | 90.4% |

From the above examples, when the activated carbon/Pd—Ga liquid alloy composite catalyst provided by the present invention is used for acetylene hydrogenation to prepare ethylene, the conversion rate of acetylene is as high as 99.8%, while the ethylene selectivity is as high as 98.9%.

The above descriptions are merely preferred implementations of the present invention. It should be noted that a person of ordinary skill in the art may further make several improvements and modifications without departing from the principle of the present invention, but such improvements and modifications shall also be deemed as falling within the protection scope of the present invention.

What is claimed is:

1. An activated carbon/palladium-gallium (Pd—Ga) liquid alloy composite catalyst, comprising a support and an active component supported on the support, wherein the support is acid washed activated carbon, and the active component is Pd—Ga liquid alloy.

2. The activated carbon/Pd—Ga liquid alloy composite catalyst according to claim 1, wherein a loading amount of Pd in the Pd—Ga liquid alloy is 0.1 to 1 wt %, and a loading amount of Ga in the Pd—Ga liquid alloy is 0.3 to 3 wt %.

3. A preparation method of the activated carbon/Pd—Ga liquid alloy composite catalyst according to claim 2, comprising the following steps:
   (1) mixing palladium precursor(s) and gallium precursor(s) with water to obtain a mixed solution;
   (2) immersing acid washed activated carbon in the mixed solution obtained in step (1), and then drying to obtain the acid washed activated carbon supported with the palladium precursor(s) and the gallium precursor(s); and
   (3) calcining and reducing the acid washed activated carbon supported with the palladium precursor(s) and the gallium precursor(s) obtained in step (2) to obtain the activated carbon/Pd—Ga liquid alloy composite catalyst.

4. The preparation method according to claim 3, wherein preparation of the acid washed activated carbon in step (2) comprises: immersing the activated carbon in an acid solution, and then drying to obtain the acid washed activated carbon.

5. The preparation method according to claim 4, wherein acid(s) in the acid solution is at least one selected from the group consisting of sulfuric, nitric, phosphoric, hydrochloric, and hydrofluoric acids.

6. The preparation method according to claim 5, wherein a concentration of the acid solution is 0.3 to 4 mol/L.

7. The preparation method according to claim 4, wherein a concentration of the acid solution is 0.3 to 4 mol/L.

8. The preparation method according to claim 3, wherein the palladium precursor(s) in step (1) is at least one selected from the group consisting of palladium chloride, palladium acetate, disodium tetrachloropalladate, palladium nitrate, palladium(II) acetylacetonate, and ammonium tetrachloropalladate;
   the gallium precursor(s) in step (1) is at least one selected from the group consisting of gallium nitrate, gallium chloride, gallium(III) ethoxide, gallium(III) isopropoxide, gallium(III) 2,4-pentanedionate, and triethylgallium.

9. The preparation method according to claim 3, wherein the calcination in step (3) is conducted for 1 to 7 h at 400 to 1,200° C.

10. The preparation method according to claim 3, wherein the reduction in step (3) is conducted for 1 to 5 h at 100 to 600° C.

11. A preparation method of the activated carbon/Pd—Ga liquid alloy composite catalyst according to claim 1, comprising the following steps:
   (1) mixing palladium precursor(s) and gallium precursor(s) with water to obtain a mixed solution;
   (2) immersing acid washed activated carbon in the mixed solution obtained in step (1), and then drying to obtain the acid washed activated carbon supported with the palladium precursor(s) and the gallium precursor(s); and
   (3) calcining and reducing the acid washed activated carbon supported with the palladium precursor(s) and the gallium precursor(s) obtained in step (2) to obtain the activated carbon/Pd—Ga liquid alloy composite catalyst.

12. The preparation method according to claim 11, wherein preparation of the acid washed activated carbon in step (2) comprises: immersing the activated carbon in an acid solution, and then drying to obtain the acid washed activated carbon.

13. The preparation method according to claim 12, wherein acid(s) in the acid solution is at least one selected from the group consisting of sulfuric, nitric, phosphoric, hydrochloric, and hydrofluoric acids.

14. The preparation method according to claim 13, wherein a concentration of the acid solution is 0.3 to 4 mol/L.

15. The preparation method according to claim 12, wherein a concentration of the acid solution is 0.3 to 4 mol/L.

16. The preparation method according to claim 11, wherein the palladium precursor(s) in step (1) is at least one selected from the group consisting of palladium chloride, palladium acetate, disodium tetrachloropalladate, palladium nitrate, palladium(II) acetylacetonate, and ammonium tetrachloropalladate;

the gallium precursor(s) in step (1) is at least one selected from the group consisting of gallium nitrate, gallium chloride, gallium(III) ethoxide, gallium(III) isopropoxide, gallium(III) 2,4-pentanedionate, and triethylgallium.

17. The preparation method according to claim 11, wherein the calcination in step (3) is conducted for 1 to 7 h at 400 to 1,200° C.

18. The preparation method according to claim 11, wherein the reduction in step (3) is conducted for 1 to 5 h at 100 to 600° C.

19. A method for preparing ethylene by acetylene hydrogenation, comprising using the activated carbon/Pd—Ga liquid alloy composite catalyst prepared by the method as claimed in claim 11 as a catalyst.

20. Use of A method for preparing ethylene by acetylene hydrogenation, comprising using the activated carbon/Pd—Ga liquid alloy composite catalyst as claimed in claim 1 as a catalyst.

* * * * *